(12) United States Patent
Nowotarski

(10) Patent No.: US 6,872,271 B2
(45) Date of Patent: Mar. 29, 2005

(54) PROCESS FOR RETREADING SOLID TIRES

(75) Inventor: Bryan Nowotarski, West Islip, NY (US)

(73) Assignee: Renu Industrial Tire, Inc., Freeport, NY (US)

( * ) Notice: Subject to any disclaimer, the term of this patent is extended or adjusted under 35 U.S.C. 154(b) by 210 days.

(21) Appl. No.: 10/387,741

(22) Filed: Mar. 13, 2003

(65) Prior Publication Data

US 2003/0178125 A1 Sep. 25, 2003

Related U.S. Application Data

(60) Provisional application No. 60/367,030, filed on Mar. 22, 2002.

(51) Int. Cl.[7] ............................................... B29D 30/54
(52) U.S. Cl. ..................... 156/96; 156/112; 264/36.14; 425/17
(58) Field of Search ........................... 156/96, 112, 113, 156/909; 264/36.14; 425/17, 28.1; 152/209.6

(56) References Cited

U.S. PATENT DOCUMENTS

| | | |
|---|---|---|
| 1,330,128 A | 2/1920 | Long |
| 3,808,076 A | 4/1974 | Barwell |
| 4,130,384 A | 12/1978 | MacMillan |
| 4,566,515 A | 1/1986 | Kühn |
| 5,667,812 A | 9/1997 | Shimizu |

FOREIGN PATENT DOCUMENTS

| | | |
|---|---|---|
| JP | H6-79808 A | 3/1994 |
| JP | H9-164606 A | 6/1997 |

OTHER PUBLICATIONS

Marvin Bozarth, "Niche Marketing to Improve Margins", *ITRA Journal*, Sep. 1999.

Primary Examiner—Geoffrey L. Knable
(74) Attorney, Agent, or Firm—Mark Nowotarski

(57) ABSTRACT

An improved means for retreading a solid tire is disclosed. The retreading means comprises wrapping uncured rubber around the periphery of the tire, clamping the tire body and uncured rubber assembly in a C mold comprising a tread ring and a sidewall ring and curing the tire.

10 Claims, 3 Drawing Sheets

PROCESS FOR RETREADING SOLID TIRES

CROSS-REFERENCE TO RELATED APPLICATION

This application claims the benefit of the filing date of U.S. provisional application entitled, "Process for Retreading Solid Tires", Ser. No. 60/367,030, filed Mar. 22, 2002 and which is incorporated herein by reference.

FIELD OF INVENTION

The invention relates to a method and apparatus for retreading solid tires.

BACKGROUND

Solid tires are often used in severe services where exposure to sharp objects would puncture pneumatic tires. These services include ground support vehicles at airports, forklifts, pay-loaders, scrap metal yard vehicles, and skid steel loaders.

Solid tires are often press-fit onto rims such that there is no slippage between the rims and tires during service when a substantial torque is applied to the tires. High torque is applied to tires that are used as drive wheels and/or braking wheels. When a solid tire is initially manufactured, the shape and dimension of the bead area is carefully controlled such that the force required to press the tire on the rim is enough to grip the rim in service, but not so much that the rim or tire is damaged. Some tires have steel cables imbedded near the bead area to insure that the tire with retain its initial gripping force during service. Other tires are formed directly into steel bands and the steel bands are pressed onto the rims. These are referred to as "steel band press ons". The ID of the bands must be within narrow limits due to the rigid properties of the both the steel bands and the rims. Other tires are formed of a blend of rubber and nylon fibers. The nylon fibers help the tire hold its shape and retain its gripping force during service. These tires are referred to as "friction based" solid tires.

It is desirable to retread solid tires after the tread surface has been worn. This saves money and reduces the environmental waste from otherwise discarded used tires. Retreading of solid tires generally comprises: buffing the tread surface of the used tire to expose fresh tread rubber surface; applying uncured replacement tread rubber to the tread surface; and curing the uncured tread rubber with heat and pressure to bind it to the tire body.

There are several challenges to economically and effectively retreading solid tires. These include:

"Spin-on-the-rim": When a tire body is exposed to heat and pressure during the curing operation, the bead surface changes shape and hardness such that the retread tire is prone to slip when press-fit back on the rim. This problem is known as spin-on-the-rim. Overcoming this problem is a long felt need in the industry. U.S. Pat. No. 4,566,515, to Kühn entitled "Wheel and Solid Tire Assembly Having Locking Ring", discloses an improved rim ("wheel" as used therein) suitable for preventing spin-on-the-rim of retread solid tires. It does not teach or suggest any means for retreading a solid tire. U.S. Pat. No. 5,667,812 to Shimizu entitled "Tire Vulcanizing Mold" discloses a mold suitable for forming a new solid tire. It does not teach or suggest any means for retreading a solid tire. U.S. Pat. No. 3,808,076 to Barwell entitled "Methods and Apparatus for Applying Tread to Tyres or Wheels" discloses a method for retreading solid tires. It does not, however, teach or suggest any means to minimize spin-on-the-rim.

Appearance and dimensional accuracy: Solid tires often suffer deep gouges in their sidewalls due to exposure to sharp objects in service, such as when the tires are used on forklifts in scrap metal yards. The gouges are often filled by hand with uncured rubber that is then cured. This causes problems in obtaining a dimensionally accurate and cosmetically acceptable final product due to variability in the amount of rubber applied. The article "Niche Marketing to Improve Margins" by Marvin Bozarth and published in the September 1999 issue of the ITRA Journal describes the need for dimensional accuracy and cosmetic acceptability in retread solid tires. This article is incorporated herein by reference.

Width variance of tires: Solid tires that are nominally the same size (e.g. 7.00–12) often are produced with a variety of widths. This variability had heretofore made it impractical to use a single C mold to retread solid tires from various manufacturers and with various sidewall designs.

There is a need, therefore, for an improved process for retreading solid tires that is suitable for solid tires that are of various widths and can produce a product that has minimal spin-on-the-rim, is dimensionally accurate and is cosmetically acceptable. There is also the need for a mold for curing retread solid tires that is adaptable to tires that are nominally the same size but in actuality have various widths. There is also the need for an improved retread tire wherein said improved retread tire is suitable for brake wheel and/or drive wheel service.

SUMMARY OF THE INVENTION

The present invention may comprise a method of retreading a solid tire comprising the steps of:
applying uncured tread rubber to the tire to form a green assembly;
placing said green assembly in a C mold wherein said C mold comprises two halves and wherein each half comprises a spindle and wherein the spindles are dimensioned such that there is a gap therebetween when the C mold is in a closed position;
closing said C mold to the closed position; and
curing the green assembly within the C mold to form a cured assembly.

The present invention may also comprise a method of retreading a solid tire comprising the steps of:
applying uncured tread rubber to the tire to form a green assembly;
placing said green assembly in a C mold wherein said C mold comprises two halves and wherein at least one half comprises a tread ring and a sidewall ring;
closing said C mold to a closed position; and
curing the green assembly within the C mold to form a cured assembly.

The present invention may also comprise a mold for retreading a solid tire comprising two halves and wherein each half comprises a spindle and wherein the spindles are dimensioned such that there is a gap therebetween when the mold is in a closed position.

The present invention may also comprise a C mold for retreading a solid tire, said mold comprising two halves and wherein at least one half comprises a tread ring and a sidewall ring.

The present invention may also comprise an improved solid tire formed by the steps of:
applying uncured tread rubber to a solid tire body to form a green assembly;

placing said green assembly in a C mold wherein said C mold comprises two halves and wherein each half comprises a spindle and wherein the spindles are dimensioned such that there is a gap therebetween when the C mold is in a closed position;

closing said C mold to the closed position; and curing the green assembly within the C mold to form a cured assembly.

The present invention may also comprise an improved solid tire formed by the steps of:

applying uncured tread rubber to a tire body to form a green assembly;

placing said green assembly in a C mold wherein said C mold comprises two halves and wherein at least one half comprises a tread ring and a sidewall ring;

closing said C mold to a closed position; and curing the green assembly within the C mold to form a cured assembly.

DETAILED DESCRIPTION OF THE INVENTION

This invention is an improved method for retreading a solid tire. "Solid tires" are tires without any significant provision for inflation. Tires which have provision for inflation are pneumatic tires. Solid tires can be composed of an essentially homogeneous elastomeric material. Said elastomeric material may comprise a blend of rubber, filler, such as carbon powder and filamentous material, such as nylon. Solid tires can also be pneumatic tires that have been subsequently filled with a solid material, such as polyurethane gel. Solid tires can also have completely enclosed or partially enclosed gas cavities or foam filling.

An improved method for retreading a solid tire comprises the steps of:

1. Removing excess residual tread rubber to give a tire body a desired shape and surface. This prepares the tire body for receiving the replacement tread rubber.
2. Wrapping uncured tread rubber sheet around the tread surface of the tire to form a green assembly. Sufficient uncured rubber is added so that the volume of the green assembly is about equal to or slightly greater than the desired volume of the final tire with a smooth tread.
3. Placing the assembly in a C mold with a smooth tread surface.
4. Urging the C mold closed under pressure to plastically deform the uncured rubber sheet into the final desired shape.
5. Heating and curing the tread rubber in the C mold to form a cured assembly.
6. Removing the cured assembly from the C mold and carving tread grooves into the tread rubber.

Figure 1B:
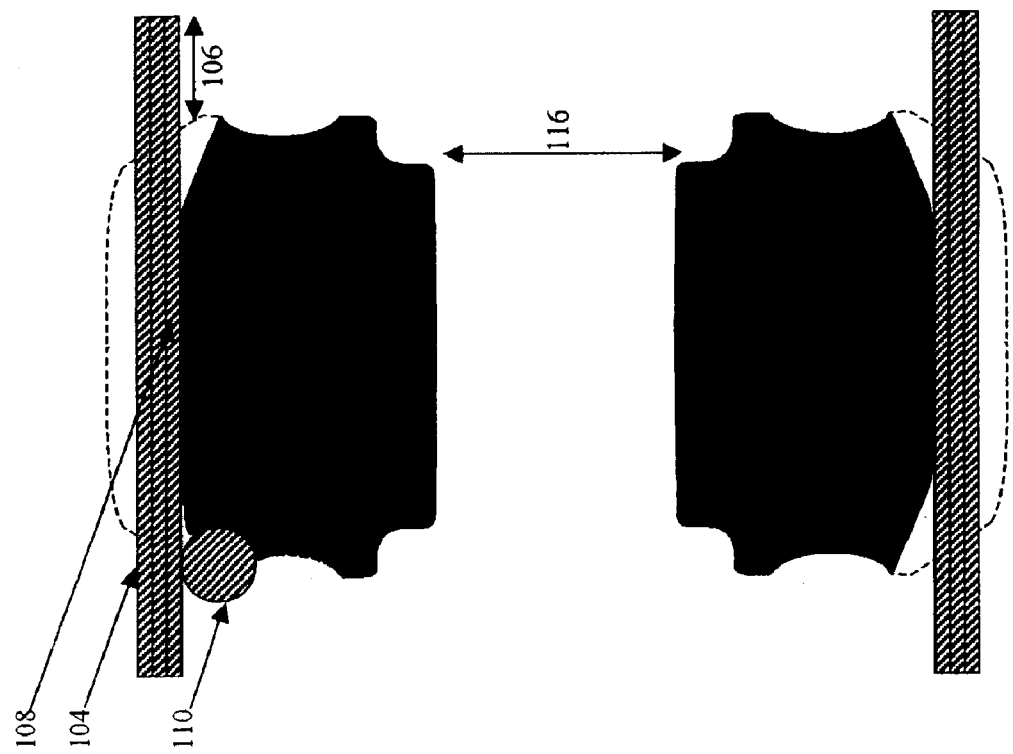
FIG. 1B: Cross section of a solid tire body after buffing and application of uncured rubber.
Figure 1A:
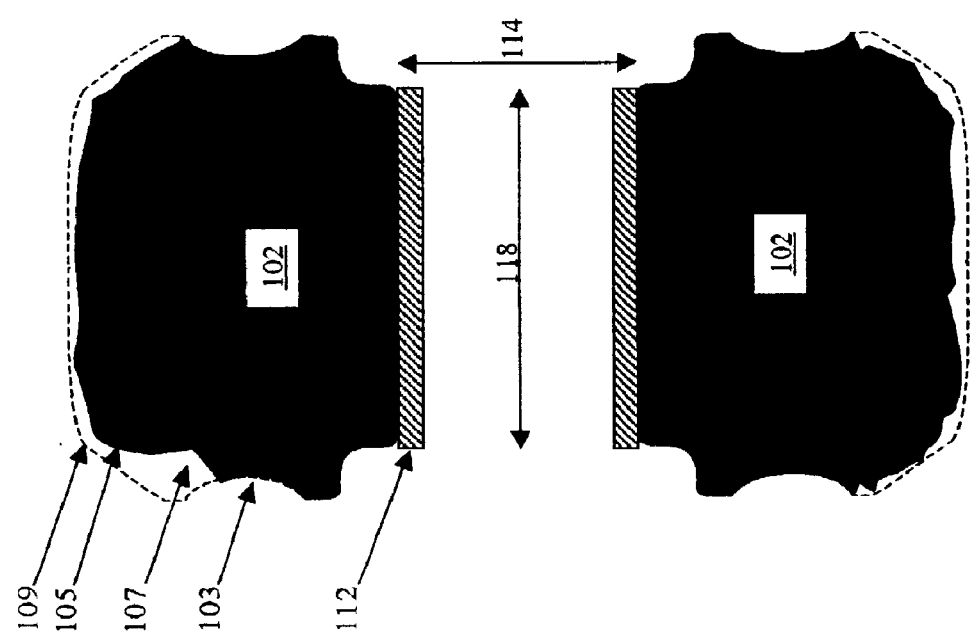
FIG. 1A: Cross section of a worn solid tire prior to retreading

Referring to FIG. 1A unless otherwise noted, the retreading process for a solid tire, 102, begins with the worn tire. The tire's profile, 105, has been reduced from the original profile, 109, due to wear and tear of the tire in service. Large gouges, 107, may be present in the sidewalls due to severe service, such as in a scrap metal yard. Solid tires often have a concave sidewall, 103. Industrial solid tires, such as those used on a forklift, are often pressed onto a metal rim, 112. The outer diameter, 114, of the metal rim is slightly larger than the inner diameter 116 (FIG. 1B), of the tire so that the tire grips the rim tightly. The width of the rim is at least as large as the width, 118, of the tire.

Referring to FIG. 1B unless otherwise noted, the first step in the retreading process is the removal of the rim, typically in a hydraulic press. A portion of the old tread rubber is then removed so that the tire has a desired profile, 108, of exposed clean rubber. A common means of removing rubber is to buff the tire using a rapidly spinning rasp. Glue may be sprayed on the exposed rubber. The glue may be water or rubber solvent based. The tire is then wrapped with sheets of uncured rubber, 104 and gouges are filled with additional uncured rubber, 110. The combination of the tire and uncured rubber is called a "green assembly". The total volume of the green assembly should be slightly larger than the final desired volume of the retread tire. It is also preferred that the sheets of uncured rubber overhang, 106, the side of the tire. The larger volume and overhang help insure that the tire fills the C mold, 203 (FIG. 2A), that it will be cured in.

Figure 2A:
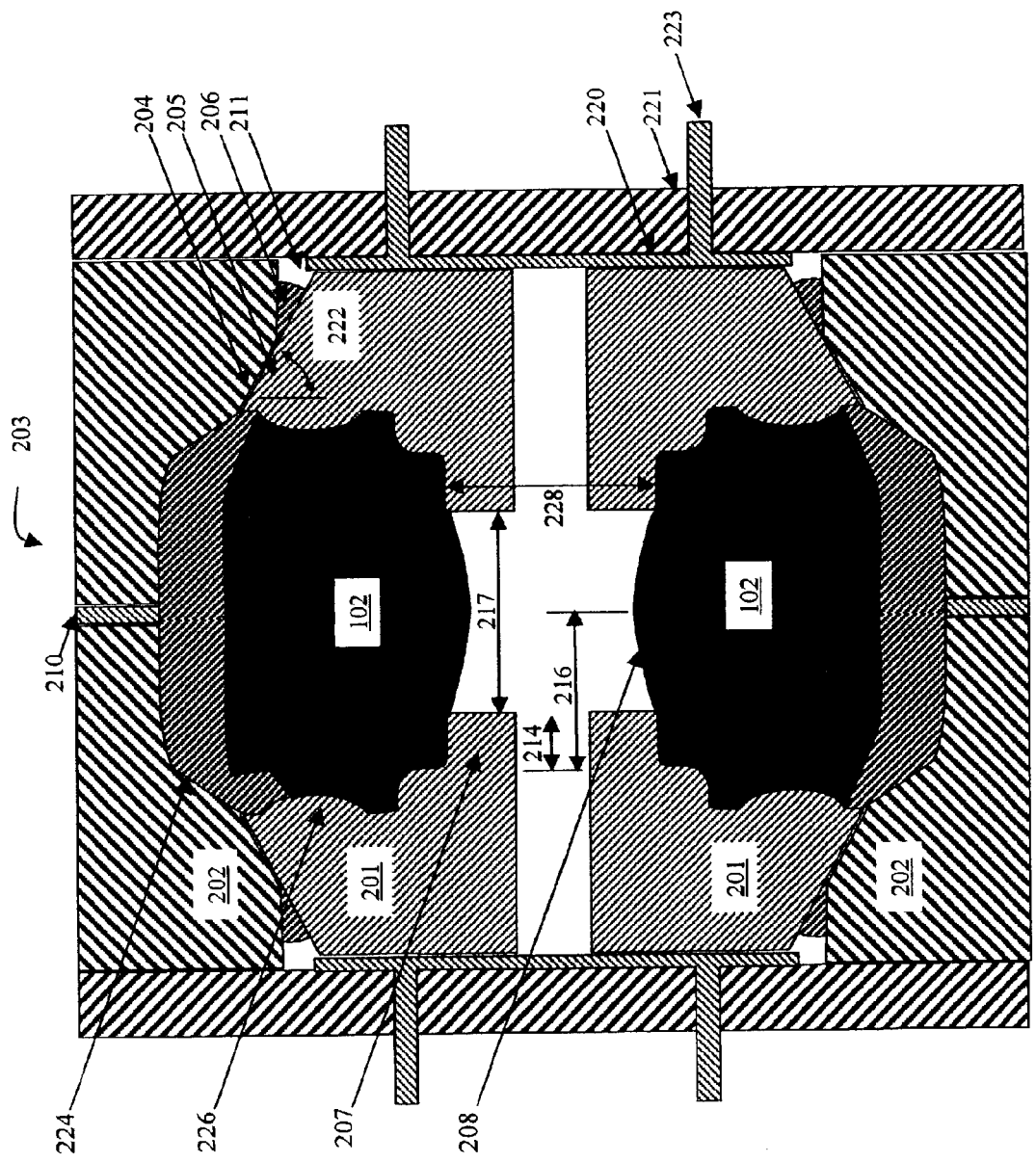
FIG. 2A: Cross section of a green assembly in a C mold.

Referring to FIG. 2A unless otherwise noted, the green assembly is placed inside a C mold 203 in order to give it its desired shape, cure the uncured rubber and bond the uncured rubber to the tire. A "C mold" is a mold that comprises two halves that are essentially circularly symmetric. Each half may comprise further subunits. The subunits are not necessarily circularly symmetric. After the green assembly is placed inside the C mold, the two halves are urged together under heat and pressure. This plastically deforms the uncured rubber such that it fills the mold and gives the tire its desired shape. Heat and preferably pressure are applied for a sufficient length of time such that the uncured rubber cures and bonds to the tire.

The green assembly is preferably preheated to a temperature just below the curing temperature of the uncured rubber prior to being placed into the C mold. The preheating helps insure good plastic deformation of the uncured rubber during the closing of the C mold and rapid and uniform curing of the uncured rubber after the C mold is closed. A preferred preheating temperature is about 200 degrees F for tread rubber that is cured at 290 degrees F. Preheating may be done in an electrically heated chamber.

In a preferred embodiment, each half of the C mold comprises two pieces. These pieces are a tread ring, 202, and a sidewall ring, 201. The tread ring forms the tread surface, 224, of the tire. The tread surface may be smooth or with indentations or bumps such that the tire is easily removable from the mold after curing. The sidewall ring forms the sidewall surface 226 of the tire.

In a more preferred embodiment, the tread ring comprises a first mating surface 204 and the sidewall ring comprises a corresponding second mating surface 205. The mating surfaces fit together with a minimal gap between them when the C mold is in a closed position. A preferred shape of the tread ring mating surface is frustoconical. The angle 222 of the frustoconical surface with respect to its axis of rotation is preferably in the range of 60 to 80 degrees and more preferably about 70 degrees.

The tread ring preferably comprises a notch such that a cavity, 211, is formed between the tread ring and the sidewall ring when the C mold is fully closed. The cavity serves to capture excess uncured tread rubber, 206, that is extruded through the gap that exists between the mating surfaces during the process of closing the mold. Once the C mold is fully closed, the mating surfaces touch and the gap is closed. This closure helps insure that the uncured rubber is under pressure during the subsequent curing operation. Other cavity means can be provided to capture the excess rubber such as holes or channels in the tread ring or sidewall ring.

In an alternative embodiment, each half of the C mold comprises a minor clamping plate 220 and a major clamping plate 221. The minor clamping plate comprises studs, 223. The minor clamping plate provides a means for separating the tread ring, sidewall ring and tire after curing. Other means may be provided, such as holes in the major clamping plate suitable for pounding a rod through.

The major clamping plates serve to urge the two tread rings and sidewall rings together under pressure after the green assembly is loaded into the mold. As the major clamping plates urge the tread rings and sidewall rings into position, the uncured tread rubber is plastically deformed into its desired shape. Excess tread rubber is extruded through the gaps between the mating surfaces and collects in the cavities as well as through vent holes that may be provided.

The provision to allow for excess rubber to escape from the tread area during the process of closing the C mold is advantageous for solid tires that are being retread. The body of a solid tire cannot deform in the same manner as can the inflated carcass of a pneumatic tire in order to compensate for excess rubber that may have been applied. If the excess rubber on a solid tire body being retread cannot extrude from the mold, then the mold will not close properly and the cured tire will not have the desired shape.

In a preferred embodiment for tires that are used as drive wheels or braking wheels, each sidewall ring comprises a spindle, 207. The diameter, 228, of the spindle is about the same as the outer diameter of the rim onto which the tire will be pressed. Preferably the spindle diameter is slightly less than the diameter of the rim. More preferably the spindle diameter is between $1/32$ and $1/8$ inch less than the diameter of the rim.

The length, 214, of the spindle is preferably less than the half width, 216, of the tire body such that there is a gap, 217, between the ends of the spindles of each sidewall plate when the C mold is fully closed. The gap allows the tire body to shrink during curing such that a portion, 208, of the tire body has a diameter that is less than the diameter of the rim. The width of the gap is preferably in the range of 25% to 75% of the width 118 (FIG. 1), of the tire. The tire formed by this preferred spindle arrangement can be press-fit onto the rim with a reasonable amount of force such that it forms a strong friction connection between the tire and the rim. The strong friction connection minimizes the slippage of the tire relative to the rim when a significant torque is applied to the rim. This makes the retread tire suitable for use as a primary braking or driving tire of a vehicle it is mounted on.

Alternative gap means in the spindles may be provided to allow a portion of the internal diameter of the tire body to shrink during curing. These other means include holes drilled in the spindle and grooves cut in the spindle.

In an alternative embodiment, the C mold comprises a spacer ring 210. The spacer ring is incorporated in the mold for tires that are wider than those that the mold was originally designed for. This allows a single mold to be used for tires of different widths. Spacer rings with widths up to 4 inches are suitable.

Figure 3B:
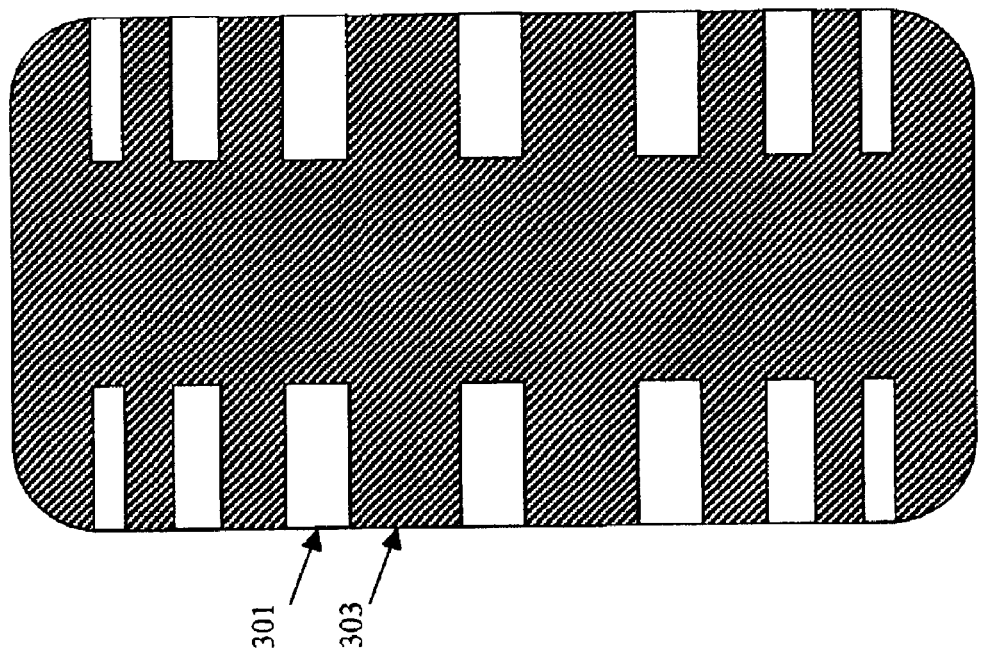
FIG. 3B: Plan view of the cured assembly illustrated in FIG. 3A.
Figure 3A:
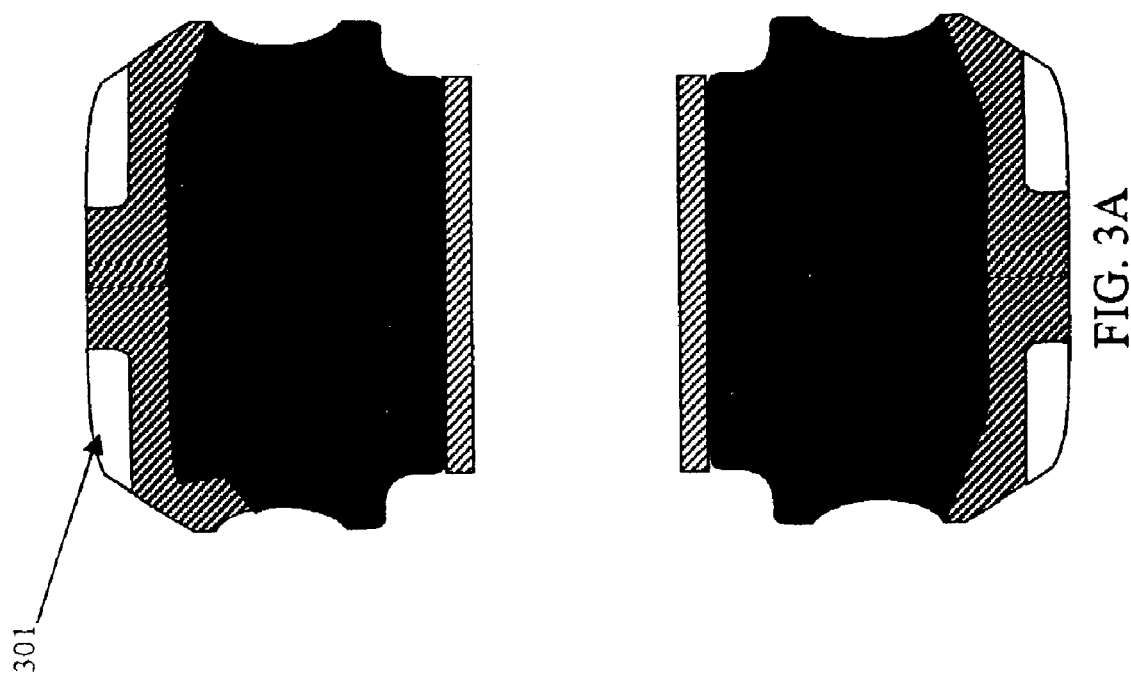
FIG. 3A: Cross section of a cured assembly after removal from a C mold and after tread had been cut in it.

Referring to FIGS. 3A and 3B unless otherwise noted, the retread tire is removed from the mold after the green assembly is cured. Optional grooves, 301, may be cut into the tread surface of the tire in order to improve the traction of the tire. Grooves that are cut transverse to the center plane of the tire form lugs, 303. Grooves may also be cut at an angle or other desired pattern.

EXAMPLE 1

Tire with Lugs

A worn, friction based, solid tire for use on a drive wheel of a forklift in service in a scrap metal yard was retread by the present process. The size of the tire was 7.00–12, where 7.00 refers to the width of the tire in inches and 12 refers to the to ID of the tire in inches. The tire was pressed off of the rim and buffed to a desired profile with a rough surface. Gouges in the sidewall were buffed and filled with an excess amount of uncured rubber. The buffed tire was sprayed with a water-based glue. Sheets of uncured tread stock rubber were wrapped around the tread surface of the tire in an amount such that the total amount of rubber was slightly more than the desired final amount of rubber in the cured tire. About 20 pounds of uncured rubber was added. The sheets of rubber were pressed onto the buffed tire using a stitcher in order to minimize entrained air and to get a good initial contact between the rubber sheets and the tread surface. This formed a green assembly.

The green assembly was preheated to 200° F. in an electrically heated chamber.

The green assembly was then placed in a C mold that comprised two halves, each half comprised a tread ring and a sidewall ring. Each sidewall ring comprised a spindle. Each spindle had a length of 1½ inches and a diameter of less than about 12 inches. When the C mold was closed, there was a gap between the spindles of 2 inches. The tread ring had a smooth tread surface. A ½ inch wide spacer ring was placed between the halves of the C mold to account for the width of the solid tire. The C mold was closed with 2000 psi of pressure applied through a 4 inch diameter piston. The mold was heated to 290° F. for 4 hours. The cured tire was removed from the C mold. Excess flashing was cut off the tire. Transverse grooves 3 inches wide, 1 inch deep and 2 inches apart were cut into the tread to form lugs in the tread surface of the final product. The tire was painted black to help give it an "as new" appearance. The final product was pressed onto the rim and the tire/rim assembly was mounted on the forklift.

A similar process was repeated with tires with sizes in the range of 9–5—5 to 36–16–30 where the first number in the size refers to the OD of the tire in inches, the second number refers to the width of the tire in inches and the third number refers to the ID of the tire in inches. A similar process was also repeated with tires with sizes in the range of 4.00–8 to 14.00–24 where the first number in the size refers to the width of the tire in inches and the second number refers to the ID of the tire in inches.

A similar process was also repeated for tires used in food service. Food service tires must be non-marking and cannot be the usual black color of tires. An original black tire was buffed and white uncured rubber was applied to the tread surface and the sidewalls. The final tire appeared white.

EXAMPLE 2

Small Tire for Baggage Carts

A worn solid tire for use on an undriven but braked wheel of an airport baggage cart was retread by the present process.

The size of the tire was 4.00–8. The tire was pressed off of the rim and buffed to a desired profile. Gouges in the sidewall were buffed and filled with an excess amount of uncured rubber. Sheets of uncured tread rubber were wrapped around the tread surface of the tire in an amount such that the total amount of rubber was slightly more than the desired final amount of rubber in the cured tire. About 3 pounds of uncured rubber was applied. The sheets of rubber were pressed onto the buffed tire using a stitcher in order to minimize entrained air and to get a good initial contact between the rubber sheets and the tread surface. This formed a green assembly.

The green assembly was preheated to 200° F. in an electrically heated chamber.

The green assembly was then placed in a C mold that comprised two halves, each half comprised a tread ring and a sidewall ring. Each tread ring and sidewall ring comprised a frustoconical mating surface. Each sidewall ring comprised a spindle. Each spindle had a length of 1 inch and a diameter of 8 inches. When the C mold was closed, there was a 1.75 inch gap between the spindles. The tread ring had a generally smooth tread surface except circumferential rings to form circumferential grooves in the final tire. The grooves were about 4/16 inch deep, 1/4 inch wide and 1/2 inch apart. No spacer ring was placed between the halves of the C mold since the C mold was the proper width. The C mold was closed with pressure. The mold was heated to 290° F. for 1 hour. The cured tire was then removed from the C mold.

Having thus described the invention with particular reference to the embodiments thereof, it will be obvious that various changes and modifications can be made therein without departing from the spirit and scope of the present invention as defined in the appended claims.

What I claim is:

1. A method of retreading a solid tire comprising the steps of:

applying uncured tread rubber to the tire to form a green assembly;

placing said green assembly in a C mold wherein said C mold comprises two halves and wherein each half comprises a spindle and wherein the spindles are dimensioned such that there is a gap therebetween when the C mold is in a closed position, said gap serving to allow the tire body to shrink during curing such that a portion of the tire body has a diameter that is less than the diameter of a corresponding rim for the solid tire;

closing said C mold to the closed position; and curing the green assembly within the C mold to form a cured assembly.

2. The method of claim 1 wherein the C mold is shaped to form a smooth tread surface on the cured assembly and wherein the method comprises the additional steps of:

removing the cured assembly from the C mold; and carving at least one groove into the smooth tread surface of said cured assembly.

3. The method of claim 1 wherein said solid tire has a corresponding rim and wherein the diameter of said spindles is not more than about equal to the diameter of said rim.

4. The method of claim 3 wherein the diameter of said spindles is about equal to the diameter of said rim.

5. The method of claim 1 wherein the gap is in the range of 25 percent to 75 percent of the width of said tire.

6. The method of claim 1 wherein the tire is a friction based tire.

7. The method of claim 1 wherein at least one half of the C mold comprises a tread ring and a sidewall ring and wherein the tread ring comprises a first mating surface, the sidewall ring comprises a second mating surface and wherein said first and second mating surfaces fit together when the C mold is in the closed position.

8. The method of claim 7 wherein said first mating surface has a frustoconical shape.

9. The method of claim 7 wherein the tread ring is notched such that a cavity is formed between the sidewall ring and the tread ring when the C mold is in the closed position, said cavity serving to hold excess rubber extruded from the tire when the mold is closed.

10. The method of claim 1 wherein the tire is formed to a desired shape by buffing prior to the step of applying uncured tread rubber to the tire to form a green assembly.

* * * * *